United States Patent Office 2,995,586
Patented Aug. 8, 1961

2,995,586
NEW ANILINE-DISULPHONIC ACID AMIDE DERIVATIVES AND PROCESS FOR PREPARING THE SAME
Rezso König and Zoltán Földi, Budapest, Hungary, assignors to Chinoin Gyogyszer-es Vegyeszeti Termekek Gyara Rt., Budapest, Hungary
No Drawing. Filed Oct. 6, 1959, Ser. No. 844,615
2 Claims. (Cl. 260—397.7)

This invention relates to 1-(α-alkoxy-alkyl-amino)-3-chloro-benzene-4,6-disulphonic acid amides which are new compounds and to methods for preparing the same.

We have found, that 1-(α-alkoxy-alkyl-amino)-3-chloro-benzene-4,6-disulphonic acid amides are on the one hand, themselves valuable pharmaceuticals and on the other hand they may be converted into known valuable pharmaceuticals e.g., in 6-chloro-7-sulphonamido-benzene-3,4-dihydro-1,2,4-thiadiazine-1,1-dioxides.

The general formula of the product according to our invention is as follows:

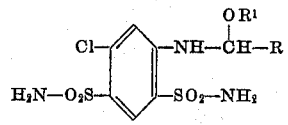

where R means hydrogen or a lower alkyl group and R1 means an alkyl group.

A very valuable representative of these compounds has the formula

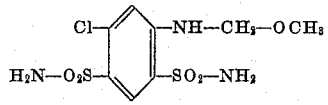

The abovementioned compounds may be prepared by reacting a compound of the general formula

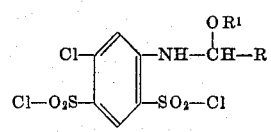

with ammonia, in which formula R and R¹ have the same meaning as given above.

The sulphonic acid chlorides according to the preceding general formula are new compounds and hitherto unknown in the chemical literature. They must be prepared according to our patent specification No. 844,643, filed October 6, 1959, e.g., 1-amino-3-chloro-4,6-benzene-disulphonic acid chloride may be reacted with monochloro dimethyl ether.

A preferred process comprises reacting 3-chloro-N-methoxymethyl-aniline-4,6-disulphonic acid chloride with ammonia. It is of advantage to carry out this reaction in ethanol or acetone as a medium. The temperature of the reaction may be varied to high extent; for the beginning of the reaction temperatures of about 0° C. or room temperature were found as preferable and finally, to raise the temperature to about 80° C. in order to complete the reaction.

Another preferred form of the process comprises reacting 3-chloro-N-methoxymethylaniline-4,6-disulphonic acid chloride with anhydrous liquid ammonia. In this case the reaction temperature is that of the boiling point of ammonia, or still lower.

Further details of the process are to be found in the examples.

Examples (1) 1.85 g. of 3-chloro-N-(methoxymethyl)-aniline-4,6-disulphonic acid chlorine (M.P. 165° C.) are added to 12.5 ml. of 3.35 N abs. ethanolic ammonia, which is chilled in ice while stirring. Stirring is continued until the yellow colour of the reaction mixture disappears. The reaction mixture is boiled for an hour under reflux, then ethanol is removed in vacuo. 10 ml. of acetone are added to the residue; the undissolved ammoniumchloride is filtered off, washed with acetone and the united filtrates evaporated to dryness in vacuo. 5 ml. of anhydrous methanol are given to the remainder, whereupon usually crystallization sets in. 5 ml. of water are then added and the resulting crystal pulp after standing is filtered and washed with 50% ethanol. After drying 1 g. of 1-(methoxymethylamino)-3-chloro-benzene-4,6-disulphonil amide is obtained in the form of snow white crystals, melting at about 170° C. The methoxy content of the product obtained is 9.4% in good conformity with the theoretical value.

On standing additional 0.2 g. of the above product precipitate from the mother liquors.

1 g. of the product dissolves in 43 ml. of ice-cold 0.1 N sodium hydroxide and on acidifying with acetic acid it may be recovered in crystal-needles.

The product of this example has—e.g., in peroral application—an excellent diuretic, as well as a hypotensive action.

The diuretic action, observed on white rats is illustrated by the following table:

| Doses administered perorally, in milligrams per kg. bodyweight | Increase (related to the control animal) of excreted urine during 5 hours, in milliliters per kg. bodyweight | Increase (related to the control animals) of excreted chloride ion during 5 hours, in milligrams per kg. bodyweight |
|---|---|---|
| 0.2 | 4 to 5 | 23 |
| 0.5 | 12 | 41 |
| 1.0 | 18 | 54 |
| 2.0 | 23 | 67 |

(2) 3.7 g. of 3-chloro-N-(methoxymethyl)-aniline-4,6-disulphonic acid chloride (M.P. 162° C.) are added in seven portions to 30 ml. of liquid ammonia, chilled with solid carbon dioxide. The acid chloride dissolves with a yellow colour which rapidly disappears. After addition is completed, excess of ammonia is evaporated. The partly crystalline, partly amorphous residue is kept at 30° C. under reduced pressure. The remainder weighs 4.4 g. On addition of 15 ml. of water a sticky product precipitates, which disintegrates to a white powder on rubbing and/or addition of a few drops of acetic acid. Chilled in ice water for about an hour it is filtered by suction, washed with 2×1 ml. of water. Dried at 10 mm. pressure over P₂O₅, 2.9 g. of a snow-white product, 1-methoxymethyl-3-chloro-amino-benzene-4,6-disulphon-amide is obtained, which melts in this state at 166° C. (decomposition).

Further amounts of the product crystallize from the aqueous mother liquors.

We claim:
1. Compounds of the formula

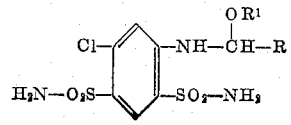

where R is a member of the group consisting of hydrogen and lower alkyl and R$^1$ is lower alkyl.
2. The compound of the formula
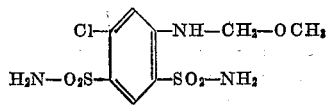
References Cited in the file of this patent
UNITED STATES PATENTS
2,910,474    Novello _____ Oct. 27, 1959

UNITED STATES PATENT OFFICE
CERTIFICATE OF CORRECTION

Patent No. 2,995,586                                  August 8, 1961

Rezso König et al.

It is hereby certified that error appears in the above numbered patent requiring correction and that the said Letters Patent should read as corrected below.

In the heading to the printed specification, between lines 8 and 9, insert the following:

Claims priority, application Hungary Feb. 19, 1959

Signed and sealed this 19th day of December 1961.

(SEAL)
Attest:

ERNEST W. SWIDER                      DAVID L. LADD
Attesting Officer                      Commissioner of Patents
                                                                    USCOMM-DC